May 27, 1952     C. W. WAITE     2,598,471
ILLUMINABLE ARTIFICIAL FISHING BAIT
Filed Oct. 23, 1946
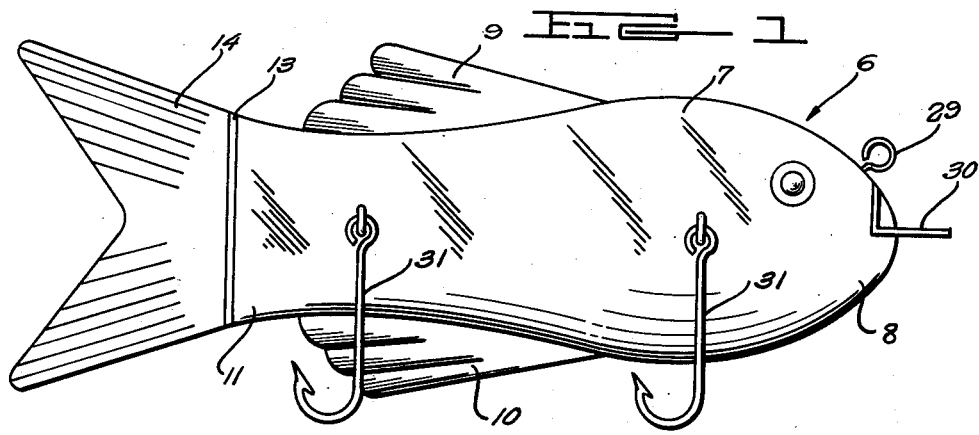
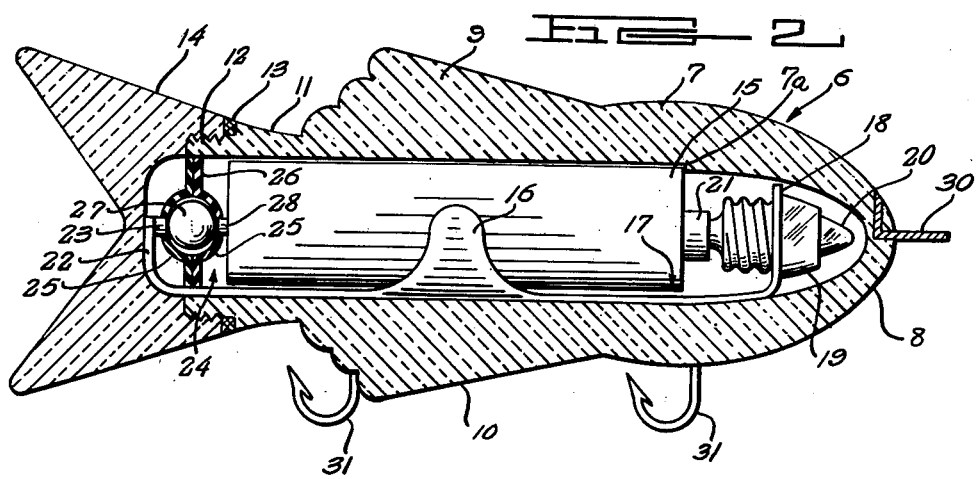
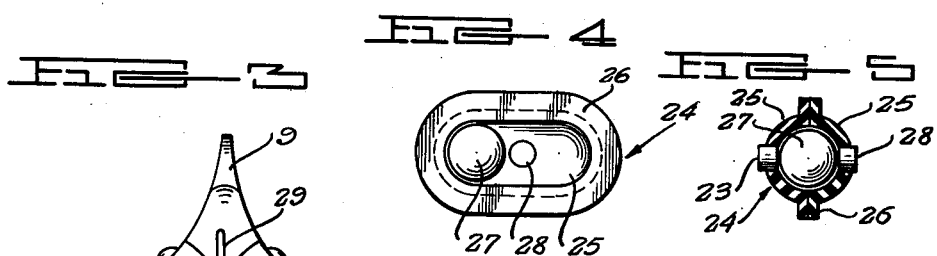
Inventor
Cyril W. Waite
By Clarence A. O'Brien
and Harvey B. Jacobson
Attorneys Patented May 27, 1952

2,598,471

UNITED STATES PATENT OFFICE 2,598,471

ILLUMINABLE ARTIFICIAL FISHING BAIT

Cyril W. Waite, Cleveland, Ohio

Application October 23, 1946, Serial No. 705,171

1 Claim. (Cl. 43—17.6)

This invention relates to certain improvements and refinements in luminous artificial baits, lures and the like and appertains to one which is primarily unique in that it involves the use of a transparent illuminable body which is so designed, fashioned and of such a configuration as to enhance its inherent powers of attraction and its dependable resultfulness in alluring fish in a manner to skillfully snare same.

It is to be pointed out, by way of introduction to the description, that the invention is similar, structurally and functionally, and from a generic standpoint, to the companion lure covered in the artificial fish bait disclosed in Patent 2,500,442 granted to me under date of March 14, 1950 and which comprehends, broadly asserted, an illuminable lure characterized by a glass or equivalent transparent body, a source of light in the body and means carried by the body for rendering the emitted light rays intermittently effective.

In carrying out the principles of the invention, I utilize a structure employing a body of special external configuration and appearance, a source of light in the body, means carried by said body for rendering the emitted light rays intermittently operable and observable, said means being controllable by the motion of the lure through a body of water and being indiscriminately timed in order that the intervals between the "off" and "on" light ray emissions are neither fixed nor uniform, and said body having a plate on its nose portion to promote the desired dashing and darting motions.

More particularly, the bait covered in the aforesaid patent has to do with a tail which is hingedly attached to the body and a cam surfaced finger which is associated with the tail and the contact switch associated with the body, the movement of the tail and associated finger acting upon the switch to actuate intermittently the lighting operation of the bulb.

By contrast, the invention to be herein revealed employs circuit make and break means in the tail portion of the body, said means embodying a rollable metal or equivalent ball coacting with contact points in a special insulated shell provided therefor, whereby as the ball rolls back and forth it serves to bridge the contacts and to turn the light on and off, this result being attainable by the shifting maneuvers of the bait plunging through the water.

Briefly summarized, the invention has to do with a novel fixture which constitutes a mount and holder for a dry cell battery, which has a laterally directed forward end with a forwardly projecting truncated conical bulb holder at one end and has its opposite trailing or rear end laterally directed and spaced from the adjacent end of the dry cell a predetermined distance. A readily insertable and removable switch or circuit make-and-break unit or device is mounted in this space and embodies an elongate shell. Contact buttons are mounted in the sections of the shell and project into the chamber portion of said shell and there is a rollable ball mounted in this chamber portion which works back and forth between the respective diametrically opposite contacts and, in this way, opens and closes the circuit. The ball is dashed back and forth by the movements of the lure body in which said fixture is mounted. The tail is readily attachable and removable and serves to cover and uncover the receiving chamber in said body in which the assembly comprising the battery, U-shaped fixture, bulb and circuit make-and-break device are mounted.

Other objects, features and advantages will become more readily apparent from the following description and the accompanying illustrative drawings.

In the drawings, wherein like numerals are employed to designate like parts throughout the views:

Figure 1 is a side elevational view of an illuminable artificial fishing bait constructed in accordance with the principles of the present invention;

Figure 2 is a partial longitudinal sectional view through the device with certain portions shown in elevation;

Figure 3 is a front end elevation;

Figure 4 is a view detailing parts of the circuit make and break means; and,

Figure 5 is a cross-sectional view through the device of Figure 4 showing the circuit make and break means at right angles to that illustrated in Figure 4.

Referring now to the drawings by distinguishing reference numerals, it will be seen that the body, in a unitary structural sense, is denoted by the numeral 6 and comprises a glass or equivalent transparent main body portion 7 with an appropriately shaped and ornamented nose portion 8 and upper and lower rudder-like fins 9 and 10. The somewhat conical and flaring tail portion 11 is provided with a reduced screw-threaded neck 12 defining a shoulder for a gasket ring 13 and providing a suitable mount for the detachable tail 14. The body, as is evident, is contoured externally to simulate a fish and is internally prepared to provide an elongated cylindrical chamber which serves to accommodate, primarily, a flashlight battery or so-called dry cell 15. In this connection it will be observed that the forward portion of the chamber is of a reduced diameter and provides a stop shoulder 7a which serves a significant purpose to be hereinafter stressed. The battery is harnessed in the saddle portion 16 of the elongated U-shaped adaptor bracket 17. The latter embodies an elongated strip member having one lateral end 18 provided with a truncated conical collar 19 to accommodate a bulb 20 held in co-action with a contact 21 on the battery. The opposite end of the battery is spaced from the laterally directed rear end portion 22 of the strip member, said end engaging a contact button 23 projecting into a sectional shell assembly 24 forming the stationary part of a circuit make and break device. Said shell is made up of suitably insulated half-sections 25 of horizontally elongated bulbiform shape and having marginal flanges 26 secured together. The sections 25 form an elongated chamber portion for the rollable circuit closing metal, mercury, or equivalent ball 27 this operating back and forth between the button 23 on one side and the complemental button 28 on the other side, the latter button being in electrical connection with the adjacent end of the battery 15. The circuit make and break device is a switch and therefore turns the current "off" and "on" to light the bulb more or less in indeterminable fashion.

Emphasis is placed on the simple U-shaped fixture or bracket which is characterized by the linearly straight strip portion having a lateral end 18 with a frusto-conical collar 19 tightly embracing the bulb 20 and having diametrically opposite wings 16 saddling the intermediate part of the dry cell on the strip 17 at the proper place. What with this arrangement, one end contact 21 on the battery is lined up properly with the contact on the bulb 20. Added novelty has to do with the lateral end 22 which is spaced from the adjacent end of the battery and which provides a space of requisite nicety to accommodate the insertable and removable horizontally elongated shell 24. This is of insulation and has flanges and defines a chamber which is cylindrical in cross-section and carries diametrically opposite ball contacts, the ball rolling back and forth between the contacts in a fully explained fashion. A shell of this type, with contacts forced between the end of the dry cell battery and the lateral end 22, makes for a unique assemblage. This complete assemblage, the U-shaped bracket, bulb, battery and circuit make and break unit, is ideal to be slipped in and out of the body chamber. The aforementioned shoulder 7a provides a stop or check and the latter is engaged by the adjacent end of the battery, whereby to thus limit the extent to which the over-all assemblage may be inserted into said chamber. By screwing on the tail, which constitutes a cap, the tail binds against 22 and all of the components of said assembly are well pressed together and safely retained against displacement.

The body is provided with a line eye 29 and the nose portion 8 below the eye is provided with an L-shaped baffle plate which serves as a wobble element 30. The fishing hooks 31 are suitably attached to various points on the body as meets the requirements of the manufacturer and users.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

An artificial illuminable lure comprising a body including a forward section closed at its forward end and open and externally screw-threaded at its trailing end and defining a chamber, the forward end portion of said chamber being reduced in diameter and providing a stop shoulder, a one-piece multipurpose holder of a length substantially commensurate with the length of said chamber and fitting removably into said chamber, said holder embodying an elongate strip having opposed battery saddling clips intermediate its ends, having a laterally disposed forward end which is axially apertured and provided with a forwardly protruding truncated conical bulb embracing and holding collar, and also having a laterally directed rearward end projecting slightly beyond and partially spanning the corresponding open end of said chamber, a bulb removably lodged in said collar, a dry cell battery seated in said clips and resting on said strip, engaging said bulb and abutting said shoulder, a readily insertable and removable circuit make-and-break unit embodying a shell of insulation material interposed between the rear end of the battery and embodying an elongated chamber, a ball rollable in said chamber, diametrically opposite contact buttons mounted in opposed walls of said shell and having inner ends exposed within the limits of said chamber and their outer ends exposed and projecting beyond the exterior surface of said walls, said unit fitting in an existing space between said dry cell battery and rearward laterally directed end and said buttons engaging the latter and said dry cell, said holder, bulb, battery and circuit make and break unit providing a ready insertable and removable assemblage and the engagement of said battery with said shoulder serving to establish the proper position of said assemblage, and a closing cap screwed on the screw-thread rear open end of said body and having end thrust retention contact with said rearward laterally directed end.

CYRIL W. WAITE.

REFERENCES CITED

The following references are of record in the file of this patent:

UNITED STATES PATENTS

| Number | Name | Date |
| --- | --- | --- |
| 1,363,924 | Saborsky | Dec. 28, 1920 |
| 1,964,954 | Leins | July 3, 1934 |
| 2,070,755 | Seigle et al. | Feb. 16, 1937 |
| 2,224,471 | Burgin | Dec. 10, 1940 |
| 2,236,071 | Roskam et al. | Mar. 25, 1941 |
| 2,237,534 | Van Der Clute | Apr. 8, 1941 |
| 2,280,457 | Sutcliffe | Apr. 21, 1942 |